Nov. 27, 1923.
W. F. ROSS
DRILL
Filed March 14, 1921
1,475,514
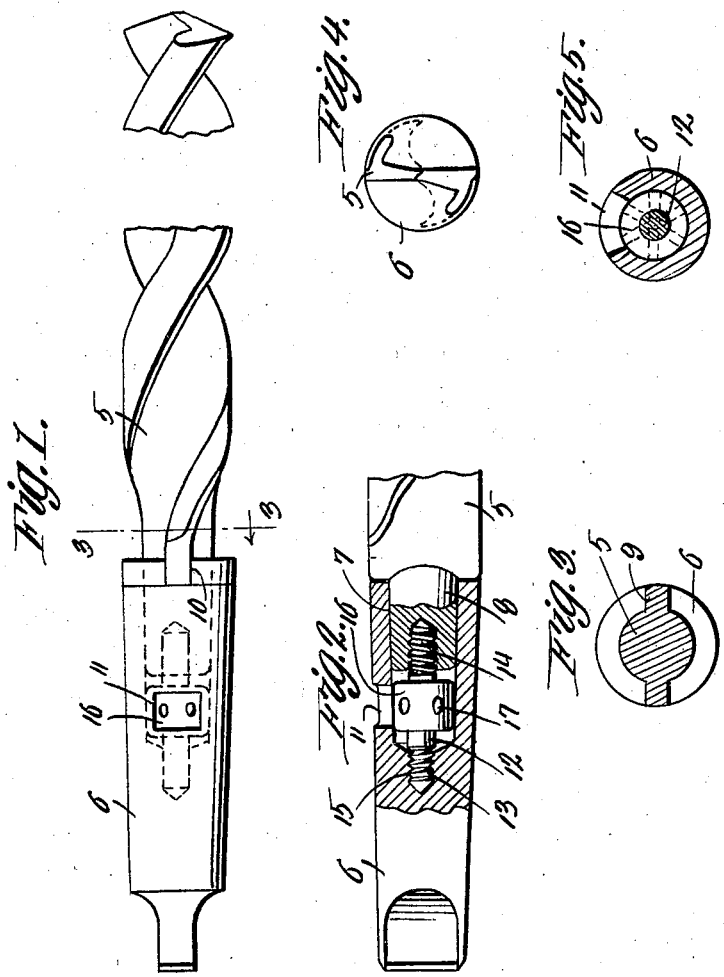
WITNESSES
WALTER F. ROSS  INVENTOR.
BY
ATTORNEY.

Patented Nov. 27, 1923.

1,475,514

UNITED STATES PATENT OFFICE.

WALTER F. ROSS, OF DETROIT, MICHIGAN.

DRILL.

Application filed March 14, 1921. Serial No. 452,061.

*To all whom it may concern:*

Be it known that I, WALTER F. Ross, a citizen of the United States, residing at Detroit, in the county of Wayne and State of Michigan, have invented certain new and useful Improvements in Drills, of which the following is a specification.

This invention relates to tools and especially to simple and efficient means for joining the cutting portions of drills, reamers, end mills, and all similar cutting tools and the principal object of the invention is to provide a strong connection between the shank and the cutting tool by means of which the consumer may replace the cutting portion at will thereby utilizing one shank to outwear a number of cutting points so as to effect great saving.

A still further object of the invention is to generally improve upon tools of this character by providing a device which will be of extremely simple, durable and inexpensive construction, one which is efficient and reliable in operation, and well adapted to the purpose for which it is designed.

With these and numerous other objects in view the invention resides in certain novel features of construction and the combination and arrangement of parts as will be hereinafter more fully described and claimed.

In the drawing:—

Figure 1 is an elevational view of the device,

Figure 2 is a fragmentary elevational view of the device showing the shank thereof partly in section, Figure 3 is a section taken on the line 3—3 of Figure 1.

Figure 4 is an end elevation of the tool proper, and

Figure 5 is a sectional view taken through the shank of the device.

Referring to the drawing in detail it will be seen that the tool proper is designated by the numeral 5 while the shank is designated by the numeral 6. This shank 6 may be of any conventional construction except that same is provided with a socket 7 for receiving the reduced tool shank 8. Both the socket 7 and tool shank 8 are preferably tapered as shown in Figure 2.

The tool proper 5 is here shown as a drill and in cross section or in end elevation, as shown in Figure 4 presents a substantially Z-shaped structure. This tool proper is provided with the usually spirally arranged cutting ribs which terminate adjacent the reduced end 8 in the diametrically extending ribs 9 as is shown clearly in Figure 3. These portions 9 of the spiral ribs are adapted to fit in the slot 10 provided in the shank 6 at its end adjacent the tool proper 5. These ribs 9 will impart the rotary movement of the shank 6 to the tool proper 5.

An opening 11 is provided in the shank 6 so as to register with the socket 7. Within this socket 7 there is situated a rod 12 having threaded portions 13 and 14. These threaded portions 13 and 14 will be oppositely threaded. The threaded portion 13 is received in the threaded reduced portion 15 of the socket 7 while the portion 14 is adapted to be received in a screw threaded socket provided in the end of the reduced tool shank 8. A block 16 is either integrally or in any suitable manner fixedly attached to the rod 12 and is provided with a plurality of apertures 17 for receiving a tool for rotating same.

From the foregoing description, taken in connection with the accompanying drawing, the construction and operation of the device will be readily understood without a more extended explanation. As numerous changes in form, proportion, and in the minor details of construction, may be resorted to without departing from the spirit of this invention, I do not wish to be limited except as set forth in the accompanying claim.

Having thus described my invention what I claim as new is:

In combination, a tool having a reduced portion at one end provided with a threaded recess, ribs extending diametrically from the tool adjacent the reduced portion, a shank having a socket therein for receiving the reduced portion of the tool and provided with diametrically opposed slots at its end for receiving the ribs of the tool, a rod having oppositely threaded portions, a block disposed intermediate the ends of the rod and between the threaded portions thereof, said shank provided with a threaded recess in the bottom of its socket, said rod engaging the threaded recesses of the shank and the reduced portion of the tool, said shank provided with an opening leading into its socket and registering with the block therein, said block provided with an annular series of apertures so that a tool passing through the opening in the shank may be engaged with the apertures for turning the block in the manner and for the purpose specified.

In testimony whereof I affix my signature in presence of two witnesses.

WALTER F. ROSS.

Witnesses:
   JAMES FRANCIS,
   JOHN J. FRANCIS.